(12) United States Patent
George et al.

(10) Patent No.: US 10,244,022 B2
(45) Date of Patent: *Mar. 26, 2019

(54) MEDIA STREAMS FROM CONTAINERS PROCESSED BY HOSTED CODE

(71) Applicant: Microsoft Technology Licensing, LLC, Redmond, WA (US)

(72) Inventors: Sam J George, Kenmore, WA (US); Gilles Khouzam, Bothell, WA (US); Michael R Harsh, Redmond, WA (US); Gurpratap Virdi, Bellevue, WA (US); John Gossman, Seattle, WA (US); Michael John Hillberg, Beaux Arts Village, WA (US); Greg D Schechler, Seattle, WA (US); Donald D Karlov, North Bend, WA (US); Eldar A Musayev, Sammamish, WA (US); Wenbo Zhang, Redmond, WA (US); Serge Smirnov, Redmone, WA (US); Federico Schliemann, Redmond, WA (US); Lawrence Wayne Olson, Redmond, WA (US); Akshay Johar, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/338,321

(22) Filed: Jul. 22, 2014

(65) Prior Publication Data

US 2014/0337433 A1    Nov. 13, 2014

Related U.S. Application Data

(63) Continuation of application No. 12/118,850, filed on May 12, 2008, now Pat. No. 8,789,168.

(51) Int. Cl.
 *H04L 29/06* (2006.01)
 *G06F 17/30* (2006.01)
 *G06F 9/54* (2006.01)

(52) U.S. Cl.
 CPC .............. *H04L 65/60* (2013.01); *G06F 9/54* (2013.01); *G06F 17/30058* (2013.01)

(58) Field of Classification Search
 CPC ....... G06F 17/30058; G06F 9/54; H04L 65/60
 (Continued)

(56) References Cited

U.S. PATENT DOCUMENTS 5,613,060 A * 3/1997 Britton et al. .................. 714/15
5,657,423 A * 8/1997 Benbassat et al. ........... 704/230
(Continued)

OTHER PUBLICATIONS

Benjamin, "Smart TV Security: Media Playback and Digital Video Broadcast, Chapter 2", 2015, Cham: Springer, p. 15-33.*
(Continued)

*Primary Examiner* — Taghi Arani
*Assistant Examiner* — Gregory Lane

(57) ABSTRACT

Described is a technology by which code, such as an untrusted web application hosted in a browser, provides content through an interface for playback by an application environment, such as an application environment running in a browser plug-in. Content may be in the form of elementary video, audio and/or script streams. The content is in a container that is unpackaged by the application code, whereby the content may be packaged in any format that the application understands, and/or or come from any source from which the application can download the container. An application environment component such as a platform-level media element receives information from an application that informs the application environment that the application is to provide media stream data for playback. The application environment requests media stream data (e.g., samples)

(Continued)

from the application, receives them as processed by the application, and provides the requested media stream data for playback.

20 Claims, 4 Drawing Sheets

(58) Field of Classification Search
USPC .......................................... 726/21; 434/350
See application file for complete search history.

(56) References Cited

U.S. PATENT DOCUMENTS

| | | | |
|---|---|---|---|
| 6,249,864 B1* | 6/2001 | Ito | G06F 9/4401 713/2 |
| 7,657,573 B1* | 2/2010 | Hancsarik et al. | 707/809 |
| 8,165,449 B2* | 4/2012 | Ludwig | G11B 27/031 386/239 |
| 2002/0112247 A1* | 8/2002 | Horner et al. | 725/112 |
| 2002/0165879 A1* | 11/2002 | Dreyband et al. | 707/513 |
| 2003/0124502 A1* | 7/2003 | Chou | 434/350 |
| 2003/0169859 A1* | 9/2003 | Strathmeyer | H04L 29/06027 379/88.17 |
| 2004/0133794 A1* | 7/2004 | Kocher | G11B 20/00086 713/193 |
| 2004/0205830 A1* | 10/2004 | Kaneko | 725/135 |
| 2005/0015402 A1* | 1/2005 | Winter | G06F 17/30595 |
| 2005/0155057 A1* | 7/2005 | Wei | 725/38 |
| 2006/0146057 A1* | 7/2006 | Blythe | G06F 9/45537 345/506 |
| 2007/0027814 A1* | 2/2007 | Tuoriniemi | G06F 21/10 705/59 |
| 2007/0061269 A1* | 3/2007 | Dimkovic | 705/59 |
| 2010/0067672 A1* | 3/2010 | Babu et al. | 379/93.14 |

OTHER PUBLICATIONS

U.S. Appl. No. 12/118,850, Non Final Office Action Mailed Sep. 16, 2011, 21 pages.
U.S. Appl. No. 12/118,850, Final Office Action Mailed Apr. 12, 2012, 22 pages.
U.S. Appl. No. 12/118,850, Notice of Allowance Mailed Mar. 11, 2014, 10 pages.

* cited by examiner

MEDIA STREAMS FROM CONTAINERS PROCESSED BY HOSTED CODE

BACKGROUND

Contemporary browsers and other applications allow plug-ins, which in general comprise hosted software code that interacts with the hosting browser/application to provide some desired functionality. An important reason for using plug-ins is related to security, because the hosting browser limits the actions that the hosted code, which is generally untrusted, can perform.

One such plug-in is Microsoft® Silverlight™, which provides a platform that allows for development and hosting of rich web applications that typically include animation, vector graphics and/or media (e.g., audio/video) content playback. Windows Presentation Foundation (WPF) is another such platform.

In general, to play media on such a platform, the platform provides APIs that the hosted application code calls to point the media element at specific media content, e.g., by identifying a particular URI location on a server that corresponds to a container in which the media content is packaged. The platform then spawns network requests to start downloading the media. The platform parses the media content by unpacking it to extract the media content streams to provide them to a media pipeline for playback.

While such a plug-in-based model works very well for its intended purpose, there are a number of drawbacks with this design. For one, the platform needs to know each type of media container/file format so that it can extract and parse the contents; however, containers pack media streams in various, specific ways, whereby the unpacking needs to be done in specific ways. At present, such unpacking logic is hard coded in the platforms, whereby new container formats, which appear fairly regularly, need to be supported through platform updates.

Another drawback to this plug-in/platform model is that the protocols/transport mechanism used to obtain the content are limited to those the platform knows. Proprietary or other protocols/transport mechanisms cannot be used, which limits the content provider's flexibility in providing the media content.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which untrusted application code provides content through an interface for playback by an application environment, such as an application environment running in a browser plug-in. Content may be in the form of elementary video, audio and/or script streams; (a script stream can contain commands and/or data). The content may in a container that is unpackaged by the application code whereby the content may be packaged in any format that the application understands, and/or or come from any source with which the application can communicate.

In one aspect, an application environment component receives information from application-level code (e.g., an application) that informs the application environment that the application-level code is to provide media stream data for playback. The application environment requests media stream data (e.g., samples) from the application-level code, receives them as processed by the application-level code, and provides the requested media stream data to a media pipeline for playback. The requests for samples may be repeated until some event occurs, e.g., the media data is exhausted, a stop or pause operation is desired, seek operation is desired, or an error is encountered by the application or the application environment.

In one example implementation, an application environment including a platform component is provided, along with an application programming interface (API) set that couples application-level code to the platform component. The application-level code downloads and processes a content container, including unpacking content from the container to provide at least some of the content to the platform component via communication with the application environment through API calls. The application-level code may instantiate a media stream source component from an instance of an abstract class that couples to a platform-level media element through the APIs.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards decoupling the media content container downloading and unpacking operations from the media stream processing and playback. In general, the hosted code performs the downloading and unpacking operations rather than the platform (e.g., based upon Microsoft® Silverlight™ or WPF). As one result, this allows proprietary container formats, such as provided by third parties, to be developed out-of-band with the platform, e.g., independent code may unpack WMV and WMA media streams from their own, possibly custom container formats, and inject those streams for playback. As another result, the container may come from any source or sources, via any protocols and/or transport mechanisms. At the same time, security is maintained through a specific set of platform APIs that control the actions that the hosted code performs.

In one example implementation, there is provided an application environment running in a browser plug-in with an interface to allow untrusted application-level code to provide data in the form of elementary video, audio and script streams for playback by the application environment. The data may come from any source and may be packaged in any format, including formats that previous application environments are not able to process. Note that as used herein, "application-level code" refers to code that communicates through API calls to at least one lower-level platform component, regardless of any actual level.

Although many of the examples herein are described with reference to media content played in a browser/Microsoft® Silverlight™ environment, it is understood that these are only examples. As can be readily appreciated, other hosting programs and/or environments may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and content processing in general.

Figure 1:
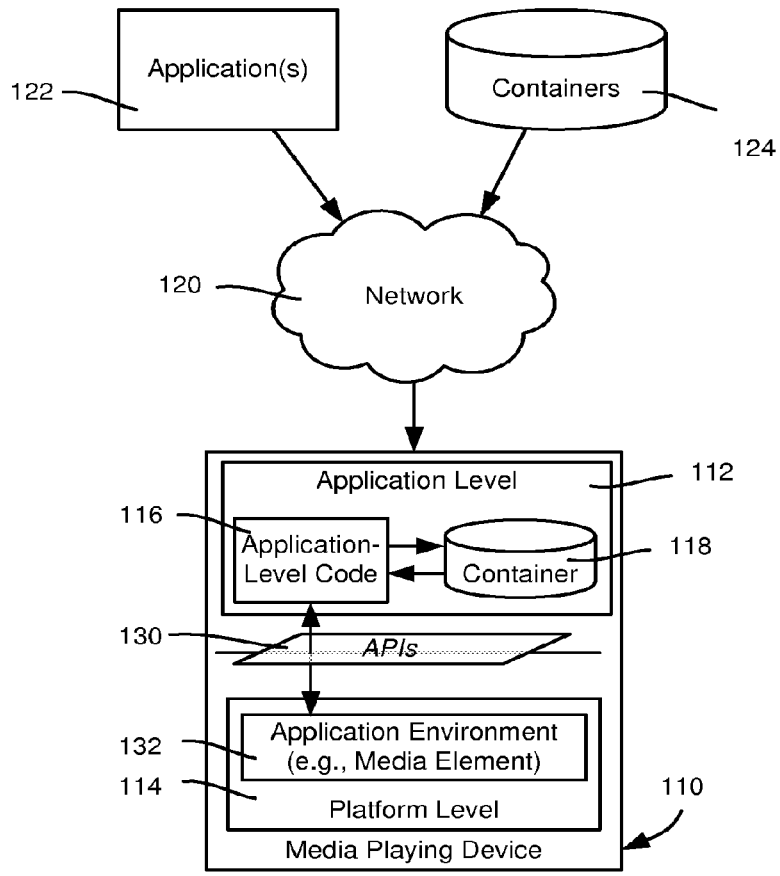
FIG. 1 is a block diagram representing example components of a network-connected media playing device that hosts application-level code and provides an application environment to playback media content.

Turning to FIG. 1, there is shown a media playing device 110 such as a personal computer system arranged with an application level 112 and a platform level 114. Other examples of media playing devices include a mobile telephone or other digital device.

Application-level code 116 such as a web application or other code is hosted in the application level 112, and as described below, processes (e.g., unpacks, extracts and delivers) content from a container 118. The application-level code 116 may be any hosted code such as a browser plug-in downloaded via any network 120, such as the Internet, as represented by the set of available applications 122. The applications 122 may be any type of code that may be executed, including script or other human readable code that is interpreted, or compiled binary or intermediate code that may be executed directly or otherwise executed. Note with respect to containers, one container option is "no container" or just raw audio or video, in which event the application may process the content as necessary for playback, e.g., to decrypt it, break it into samples, and so forth.

Because the application-level code 116 processes the container's content, the content may be in any format that the application-level code 116 understands, allowing a custom application and/or container, for example, to be hosted and have its content used in some way, e.g., played back as media. This includes known container/packages/formats, proprietary container packages/formats, extensions to existing packages/formats and future container packages/formats not yet developed.

Further, the application-level code 116 may download a container such as the container 118 from among a set of containers 124 using any suitable protocol or protocols over any suitable network transport, e.g., Sockets/HTTP. This allows the content provider significant flexibility, e.g., content may be distributed among servers, including for redundancy, load balancing, security, and so forth. For example, a single piece of content may be in different formats, in different packages, may be separated into different parts, may have different security requirements, and so forth; an application can download the different packages and merge them as needed, or select one based upon conditions, for providing the content for playback.

A container may comprise many different types of data. While in a typical example the data may correspond to various media, such as audio, video, or image media, any data type may be stored in a container. Further, a container may have two or more different sets of data, such as separate audio, video, and still image data sets, and/or each type of supported data may be distributed using different containers. Some containers may be relatively complex and may contain multiple types of data. Some containers may be supported by the application environment 104 while other containers may not be supported, even though the data contained in the containers may be compatible with the application environment 104. Note that because Silverlight™ code can be factored into code libraries, different libraries for downloading and unpacking different formats can be created, reused and shared; this provides a way to share any different, new packaging and container formats that are developed.

Code such as the exemplified application-level code 116 hosted in the application level 112 communicates with the platform level 114 through a set of APIs 130. For example, the application-level code makes API calls to an application environment 132 (corresponding to a media element) to provide media content for playback, as well as to perform other media-related operations such as seek, pause, stop and so forth. In general, regardless of the container format, the platform level 114 stays unchanged and independent of any particular application.

The application-level code 116 may also communicate with the application environment for other reasons, such as to inform the application-level code when a license for decrypting protected media (e.g., video, audio and script stream data) is required, as well as to enable the application-level code to provide the application environment with the necessary license data, e.g., for decrypting the streams. In this manner, digital rights management (DRM) may be handled internally, not by an external DRM provider, e.g., DRM License requests do not need to bubble back through managed web requests or WebClient APIs; a DRMInitializationVector provides data about the sample that is needed to decrypt it. However note that the flexibility of the API allows for other rights management systems to be used in conjunction with Silverlight™; (as one example, content may be encrypted over the network and then decrypted before passing it through the MediaStreamSource).

The application environment 132 may be a plug-in or other type of environment that uses a browser as a user interface. The browser may be a web browser, such as an operating system component, for example, and may serve as a display and human interface mechanism for application-level code (e.g., 116) that may execute in conjunction with the application environment. The application environment may plug into the browser. As a plug in, the application environment 132 may be invoked when the browser detects an application such as the application-level code 116 to execute. For example, a video element may be created in a web page displayed by a browser. The application-level code 116 may perform various actions to retrieve, process, prepare, and cause the video element to be displayed, for example. The user may be able to manipulate controls within the user interface to pause the video, seek the video to a certain point, and perform other operations based on the user input.

Figure 2:
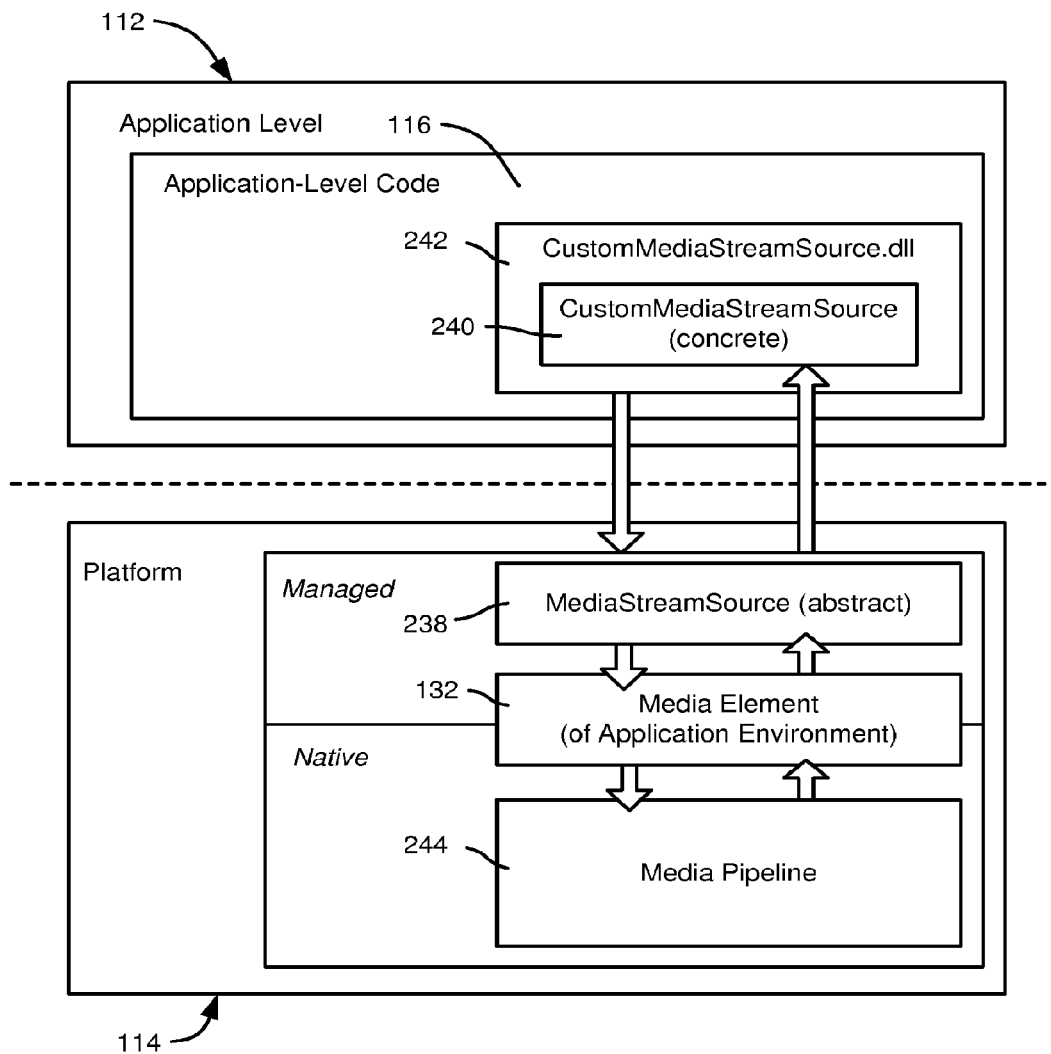
FIG. 2 is a block diagram representing example components of a particular plug-in application and platform components including mechanisms for media content playback.

FIG. 2 provides a more particular example, in which the application-level code 116 derives from an abstract type, MediaStreamSource 238, to get a concrete implementation (object instance), referred to herein as CustomMediaStreamSource 240. In this example, which represents a typical implementation, the concrete CustomMediaStreamSource 240 is provided in a separate assembly that the application-level code 116 includes, shown herein as a dynamic link library (DLL) CustomMediaStreamSource.dll, or simply DLL, 242. As described below, the concrete CustomMediaStreamSource 240 receives requests for elementary media streams and diagnostics from the media element, and the DLL 242 provides responses comprising elementary media streams and diagnostics. With those responses, the media element takes appropriate actions, including providing media streams to a media pipeline 244 for playback.

Figure 3:
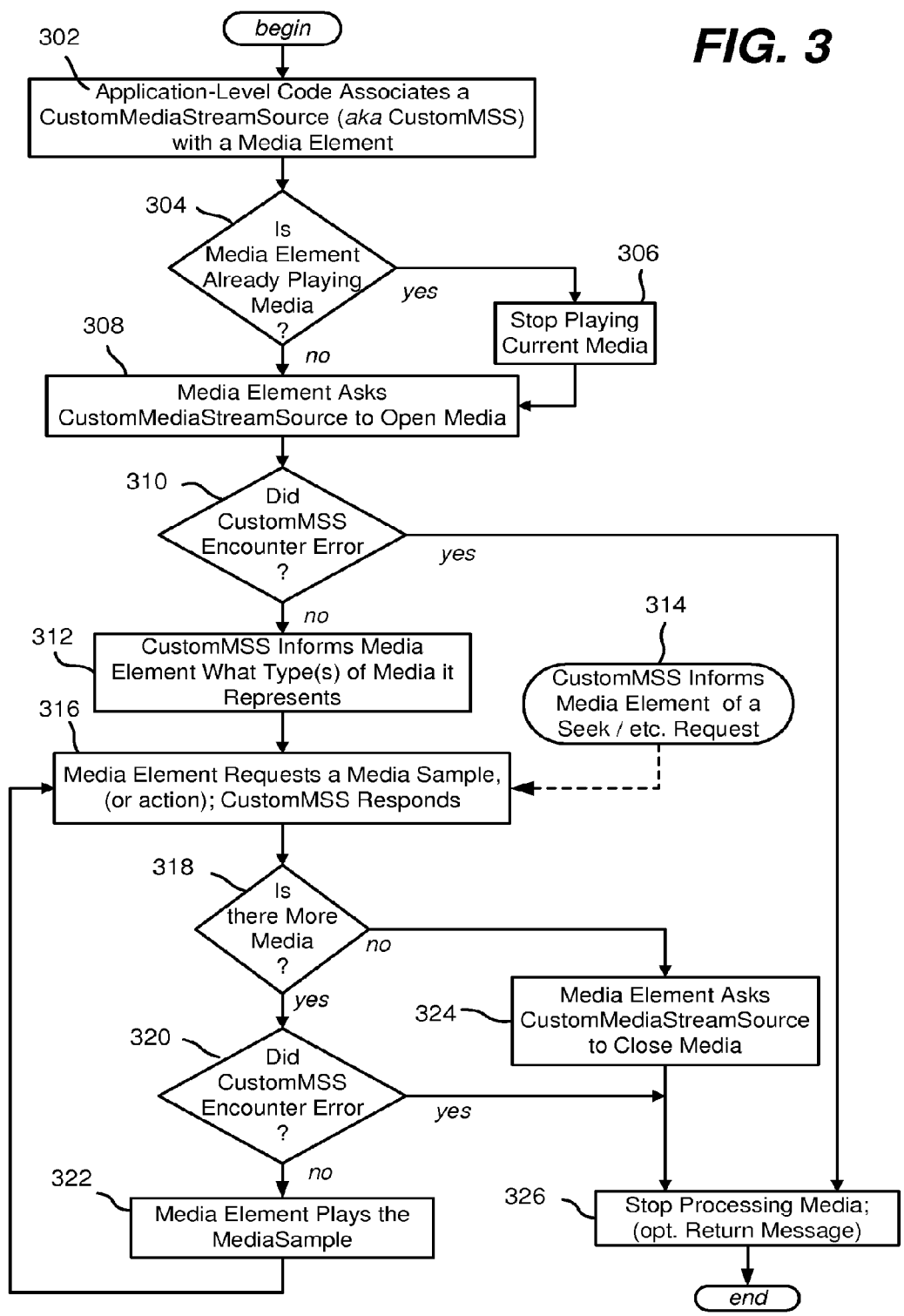
FIG. 3 is a flow diagram generally representing example steps taken by hosted application-level code and a media element of a platform to playback media content.

By way of example, FIG. 3 is a flow diagram showing typical playback, along with possible other playback related actions such as seek. Step 302 represents the application-level code 116 associating a MediaStreamSource with the media element. For example, the application may call a set source method, pointing a source property to the URI of a container, and pass a reference to the concrete CustomMediaStreamSource 240 implementation. This essentially starts a conversation between the media element and the concrete CustomMediaStreamSource 240.

The media element checks whether it is currently playing media, and if so, stops that playback as represented by step 306. In any event, at step 308 the media element asks the CustomMediaStreamSource 240 to open its media. If at step 310 there is an error encountered by the CustomMediaStreamSource (MSS), e.g., the media did not open, was corrupt, and so forth, at step 310 the processing stops, and, for example, the CustomMediaStreamSource 240 can optionally provide a message or the like to report the problem to the media element, as well as to the application such as to notify the user of a problem.

In the event that there is not a problem, at step 312 the CustomMediaStreamSource 240 informs the media element what type or types of media it Represents, e.g., WMA, WMV, MP3. As represented by step 316, the media element then starts requesting samples.

If media is available at step 318, and there is no error (step 320), the media element plays the media sample at step 322, e.g., injects it into the media pipeline 244, such as into a pipeline playback buffer. The process then continues until no more media is available, that is, the media is exhausted, at which time step 318 will branch to step 324 where the media element asks the CustomMediaStreamSource 240 to close the media. In the event an error occurred during the sample playback loop, step 320 exits the playback loop so that media processing stops, with an optional message (step 326) as described above.

Another possibility, generally represented by step 314, is that the CustomMediaStreamSource 240 requests another playback operation, such as seek, pause, stop and so forth. As represented in step 316, the media element responds by requesting that the CustomMediaStreamSource 240 take the action, as appropriate. Note that with such a mechanism, the platform level thus remains in control of the various aspects of the playback operation. The application level is responsible for processing the container content, including unpacking, extracting, selecting a sample and providing the content.

Example API

```
namespace System.Windows.Media
{
    public abstract class MediaStreamSource
    {
        public MediaStreamSource( ){ }
        protected abstract void OpenMediaAsync( );
        protected void ReportOpenMediaCompleted(IEnumerable<MediaStreamDescription> availableMediaStreams,
                IDictionary<MediaSourceAttributesKeys, string> mediaSourceAttributes)
        protected abstract void SeekAsync(Int64 seekToTime);
        protected void ReportSeekCompleted(Int64 timeSeekedTo) { }
        protected abstract void GetSampleAsync( MediaStreamType mediaStreamType );
        protected void ReportGetSampleCompleted( MediaStreamSample mediaSampleDescription ) { }
        protected void ReportGetSampleProgress(double bufferingProgress ) { }
        protected abstract void SwitchMediaStreamAsync(MediaStreamDescription mediaStreamDescription);
        protected void ReportSwitchMediaStreamCompleted(MediaStreamDescription mediaStreamDescription) { }
        protected abstract void GetDiagnosticAsync(MediaStreamSourceDiagnosticKind diagnosticKind);
        protected void ReportGetDiagnosticCompleted(MediaStreamSourceDiagnosticKind diagnosticKind,
                        double diagnosticValue) { }
        protected abstract void CloseMedia( );
        protected void ErrorOccurred(string errorDescription)
    }
    public class MediaElement
    {
        public int AudioStreamIndex { get; set; }
        public void SetSource(MediaStreamSource mediaSource) { }
    }
    public enum MediaStreamSourceDiagnosticKind
    {
        DownloadProgressAsPercent
    }
    public class MediaStreamDescription
    {
        public MediaStreamDescription(MediaStreamType streamType,
                    IDictionary<MediaStreamAttributeKeys, string> mediaStreamAttributes) { }
        public MediaStreamType MediaStreamType { get; }
        public IDictionary<MediaStreamAttributeKeys, string> MediaStreamAttributes { get; }
    }
    public class MediaStreamSample
    {
        public MediaStreamSample (Stream stream,
                MediaStreamDescription mediaStreamDescription,
                Int64 offset,
```

-continued

```
            Int64 count,
            Int64 timestamp,
            IDictionary< MediaSampleAttributeKeys, string> MediaSampleAttributes) { }
        public Stream Stream { get; }
        public MediaStreamDescription MediaStreamDescription { get; }
        public Int64 Offset { get; }
        public Int64 Count { get; }
        public IDictionary< MediaSampleAttributeKeys, string> MediaSampleAttributes { get; }
        public Int64 Timestamp { get; }
    }
    public enum MediaStreamType
    {
        Audio,
        Video,
    }
    public enum MediaStreamAttributeKeys
    {
        FourCC,
        CodecPrivateData,
        Width,
        Height
    }
    public enum MediaSampleAttributeKeys
    {
        KeyFrameFlag,
        DRMInitializationVector
    }
    public enum MediaSourceAttributesKeys
    {
        CanSeek,
        Duration,
        DRMHeader
    }
}
```

Example API-Based Implementation

As described above, there is provided an abstract base class with which the media element 132 negotiates, such as to obtain elementary media streams (e.g., WMV, WMA and MP3) and diagnostics. Application developers provide concrete implementations of that abstract base class (in FIG. 2, the CustomMediaStreamSource 240 is a concrete example of the MediaStreamSource 238 abstract base class).

Via the APIs 130, the application-level code 116 instances a concrete CustomMediaStreamSource 240 and associates it with a media element 132 by calling a method on Media element 132, which in this example is MediaElement.SetSource(MediaStreamSource). After that call, normal media pipeline requests for elementary media streams are routed out to the concrete CustomMediaStreamSource 240. Through exposed APIs, such as set forth above, the CustomMediaStreamSource 240 provides the media pipeline with these elementary media streams, as well as any diagnostics information that the media element 132 requires.

In this example, with respect to a media element 132 having a MediaStreamSource set on it, when a media element 132 and a CustomMediaStreamSource 240 have been created, the application 116 calls ME.SetSource(new MSS). The media element 132 then causes MSS.OpenMediaAsync ( ) to be raised.

MediaStreamSources such as the CustomMediaStreamSource 240 are disposed of and recreated if necessary after closure. Closure occurs if the media element 132 has its Source set to a new source, if the media element 132 has SetSource(null) called on it and its Source is also null, or if an error occurred. Note that in this example implementation, an exception is thrown if an attempt is made to set Media element 132 to an already closed MediaStreamSource When the media element 132 opens and the MediaStreamSource represents a Broadcast, the media element 132 causes MSS.OpenMediaAsync to be raised. The CustomMediaStreamSource 240 collects its audio and video streams, providing MedaStreamDescriptions for each stream. The CustomMediaStreamSource 240 makes a new mediaSourceAttributes collection with Duration set to zero (0), and CanSeek set to false. The CustomMediaStreamSource 240 calls ReportMediaCompleted (media streams, attributes).

In an example implementation, when the media element 132 opens and the CustomMediaStreamSource 240 represents "On Demand" content, the media element 132 causes MSS.OpenMediaAsync to be raised. The CustomMediaStreamSource 240 collects its audio and video streams, making MedaStreamDescriptions for each stream. The CustomMediaStreamSource 240 makes a new mediaSourceAttributes collection with Duration set to the duration and CanSeek set to true. The CustomMediaStreamSource 240 calls ReportMediaCompleted(media streams, attributes).

The CustomMediaStreamSource 240 may correspond to multiple bit-rate streams. Note that in one example implementation, for MultipleBitRate implementers, a recommendation is to only expose one audio and one video stream (through ReportMediaCompleted) that declares the highest allowed bit rate, and pass samples of different bitrates as needed in ReportGetSampleCompleted. For example, content may be encoded multiple times, with different bit rates, each corresponding to a container cut from a file into URI-addressable chunks. The client and/or server may alter which chunks it downloads based on conditions, e.g., network load, client load, server load, and so forth, such as to provide different video quality/resolution based upon load conditions rather than pausing playback.

When the CustomMediaStreamSource 240 corresponds to multiple audio streams, the media element 132 causes MSS.OpenMediaAsync to be raised. The CustomMediaStreamSource 240 collects its audio stream and video stream, making MediaStreamDescriptions for each stream. The CustomMediaStreamSource 240 calls ReportMediaCompleted(Audio streams, and video MediaStreamDescriptions).

Note that the MediaStreamSource may contain multiple video streams, e.g., developers can attempt to switch between multiple video streams, although results are not guaranteed in one implementation. To facilitate script commands and markers, in one implementation, developers use the media element 132's TimelineMarkers collection.

When the media element 132 has Stop called on it, in one typical example, the media element 132 stops raising MSS.GetSampleAsync(media type). Application developers use the media element's CurrentStateChanged event and CurrentState property in conjunction with a CustomMediaStreamSource 240 to implement this. Library developers may expose a method for an app developer to hook up the CurrentState changes from the media element 132 with their CustomMediaStreamSource's Stop logic.

When the media element 132 has Pause called on it, in one typical example, the media element 132 stops raising MSS.GetSampleAsync(media type). To obtain a notification of state change, application developers use a media element's CurrentStateChanged event and CurrentState property in conjunction with a CustomMediaStreamSource. Library developers may expose a method for an application developer to hook up the CurrentState changes from the media element 132 with their MediaStreamSource's Pause logic.

When resuming from a paused state, by calling Play on the media element 132, e.g., a video player application causes ME.Play( ) to be called, the media element 132 starts raising MSS.GetSampleAsync(media type). When resuming from a Stopped state, a video player causes ME.Play( ) to be called, and the media element 132 raises MSS.SeekAsync (beginning of stream). The CustomMediaStreamSource 240 calls ReportSeekCompleted(very near to the beginning of stream), and the media element 132 starts raising MSS.GetSampleAsync(media type).

With respect to seeks, for a normal seek, the video player application sets ME.Position. In response, the media element 132 causes MSS.SeekAsync(new position as 100 ns ticks) to be raised. CustomMediaStreamSource 240 adjusts its streams to the nearest sample to the new location. The CustomMediaStreamSource 240 calls ReportSeekCompleted (position of the nearest sample in 100 ns ticks). The media element 132 causes MSS.GetSampleAsync (new position as 100 ns ticks) to be raised. The CustomMediaStreamSource 240 returns requested sample in MSS.ReportGetSampleCompleted.

For a Seek to the end of the stream, a video player application sets ME.Position, and the media element 132 causes MSS.SeekAsync(new position as 100 ns ticks) to be raised. The CustomMediaStreamSource 240 adjusts its streams to the nearest sample to the new location. The CustomMediaStreamSource 240 calls ReportSeekCompleted (position of the nearest sample in 100 ns ticks). The media element 132 causes MSS.GetSampleAsync (new position as 100 ns ticks) to be raised. The CustomMediaStreamSource 240 returns ReportGetSampleCompleted (null).

When the media element 132 enters an error state, e.g., the media element 132 hits an error from which it cannot recover, the media element 132 causes MSS.CloseAsync to be raised. The CustomMediaStreamSource 240 disposes of its internal state as needed, and disassociates itself from the CustomMediaStreamSource 240 by internally setting its Source to null. The CustomMediaStreamSource 240 transitions into the closed state.

When the media element 132 switches audio streams, e.g., for a scenario such as having multiple language tracks, the media player causes ME.AudioStreamIndex to be set. The media element 132 causes MSS.SwtichMediaStreamAsync (stream to switch to). The CustomMediaStreamSource 240 switches the stream and adjusts the offset on the new stream to the right time and starts buffering if necessary. The CustomMediaStreamSource 240 calls ReportSwitchMediaStreamCompleted(stream switched to);

Whenever the CustomMediaStreamSource 240 cannot complete a media element request or has an error outside of a media element request from which it cannot recover, the CustomMediaStreamSource 240 enters an error state and informs the media element 132 by calling ErrorOccured. If the CustomMediaStreamSource 240 has an unrecoverable internal error, the CustomMediaStreamSource 240 calls ErrorOccured(description of error). In response, the media element 132 receives a message and starts an internal shutdown, raises a MediaFailed event with the description of the error and causes CloseMediaAsyc to be raised. The media element 132 further disposes of any structures it needs to and cleans up, and disassociates itself from the CustomMediaStreamSource 240 by setting its internal source to null.

With respect to MediaStreamSource buffering, the media element 132 requests a sample by causing GetSampleAsync to be raised. The CustomMediaStreamSource 240 does not have the required sample and enters buffering (assuming the buffer is completely empty). The CustomMediaStreamSource 240 attempts to gather the sample from the media file and reports that it is buffering with ReportGetSampleProgress(0). After some amount of time, the media element 132 enters a buffering state, whereby the CustomMediaStreamSource 240 will eventually fill some portion (e.g., half) of its buffer; assuming half filled, the CustomMediaStreamSource 240 calls ReportGetSampleProgress(0.5). After some more time, the CustomMediaStreamSource 240 has filled the buffer to 90% and calls ReportGetSampleProgress(0.9). After some additional time, the CustomMediaStreamSource 240 has filled the buffer completely and returns a sample by calling ReportGetSampleCompleted (next sample). Sometime after receiving the sample the media element 132 transitions back into the playing state.

With respect to a typical Playback operation, the media element 132 causes GetSampleAsync(Video) to be raised, whereby the CustomMediaStreamSource 240 gathers the sample and returns it via ReportGetSampleCompleted(videoSample). This process is repeated over and over again for each type of sample, audio and/or video.

The contract between the media element 132 and a CustomMediaStreamSource 240 depends on the set of MediaStreamDescriptions that the MediaStreamSource initially passes to the media element 132. Communication from the media element 132 to the CustomMediaStreamSource 240 and from the CustomMediaStreamSource 240 to the media element 132 needs to be about this set of MediaStreamDescriptions. In other words, there is a constraint for each MediaStreamDescription that the media element 132 may pass to the CustomMediaStreamSource 240, namely that is should equals at least one of the MediaStreamDescriptions that the CustomMediaStreamSource 240 contains. In the opposite direction, the CustomMediaStreamSource 240 may know of more extra streams than it tells the media element 132, but it is not to ask the media element 132 about any of those extra streams. One way to avoid such contractual issues is for the CustomMediaStreamSource 240 to hold onto the same collection of descriptions passed during the call to ReportMediaCompleted for its lifetime.

Figure 4:
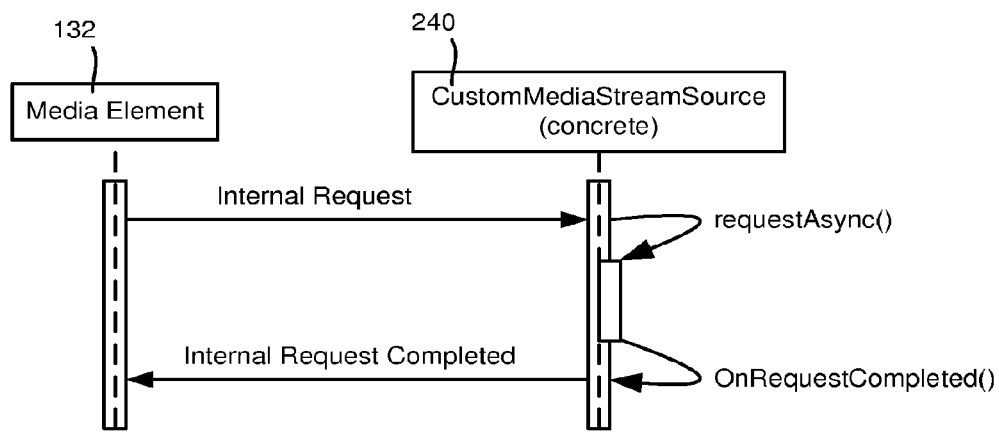
FIG. 4 is a representation of a calling pattern between a media element (platform-level component) and an instance of a media stream source (application-level component), including for playing back media content.

Developers subclass a MediaStreamSource to handle their own container formats. Most of the MediaStreamSource API work in pairs and follow the calling pattern represented in FIG. 4. That is, when the media element 132 needs information, it makes a request to an internal method on the CustomMediaStreamSource 240. The CustomMediaStreamSource's internal method calls directly to the protected "Async" method; the CustomMediaStreamSource 240 does some processing, and the CustomMediaStreamSource 240 calls the protected "Completed" method to signal that it has the requested information. The "Completed" method calls an internal method on the media element 132 to signal it has the information and to pass that information back to the media element 132.

Note that even though the method names are "Async", the code may respond synchronously with the corresponding "Completed" call from within the "Async" method; the "Async" naming is more of a hint about how the media element 132 calls this method. Further, in one example implementation, MediaStreamSource subclasses can only call "Completed" methods in response to matching "Async" methods calls; an exception to this is GetSampleAsync and ReportGetSampleCompleted. In this case, the CustomMediaStreamSource 240 may be buffering and may respond with one or more ReportGetSampleProgress calls followed by a ReportGetSampleCompleted call. In this example, if a "Completed" method is called by a CustomMediaStreamSource 240 without the media element 132 first calling the matching "Async" method, an InvalidOperationException is raised with the message "Only call *Completed in response to a call from "Async". The media element 132 only makes one "Async" call at a time and will wait for the "Completed" response from the CustomMediaStreamSource 240 before issuing another request. An exception to his is CloseAsync, which may be raised after any other Async call if the media element 132 needs to close because of an error or because the media element 132 is being closed.

Exemplary Operating Environment

Figure 5:
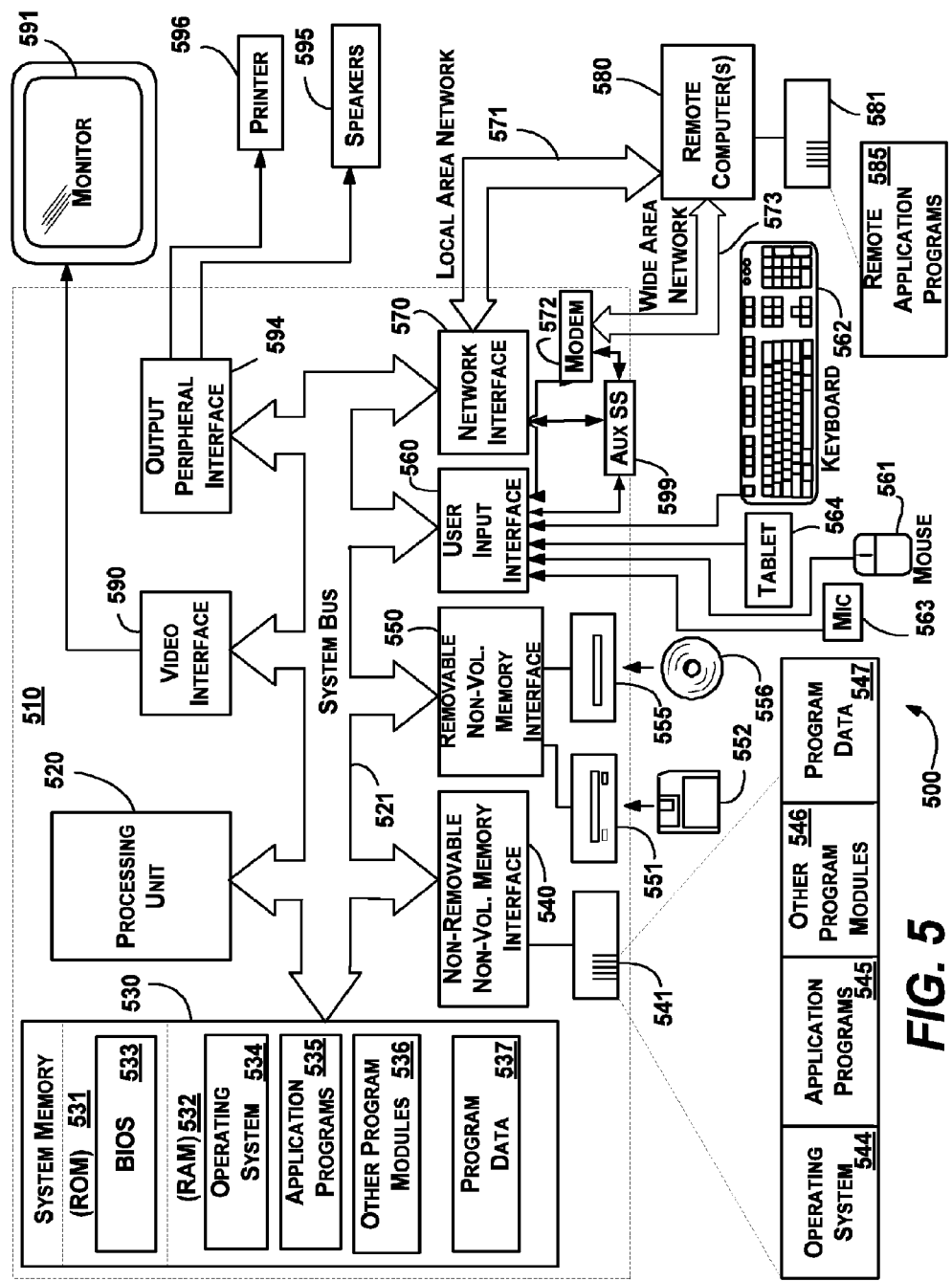
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented, e.g., the computer system 510 may correspond to the example media playing device 110. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
receiving information from untrusted application-level code that informs an application environment that the untrusted application-level code is to provide processed media stream data for playback, the untrusted application-level code being code that communicates through application programming interface calls to a platform level;
requesting at least some of the processed media stream data from the untrusted application-level code;
receiving, by the platform level, the at least some of the processed media stream data from the untrusted application-level code as processed by the untrusted application-level code from a container associated with the untrusted application-level code, the container having a format that is not supported by the platform level; and
providing the received processed media stream data to a media pipeline for playback at the platform level.

2. The method of claim 1, wherein the untrusted application-level code comprises an application level component, and wherein receiving the information comprises receiving an application program interface (API) call from the application level component to the platform level.

3. The method of claim 1, wherein receiving the information comprises receiving a communication from the untrusted application-level code that informs the application environment of media stream data availability.

4. The method of claim 1 further comprising:
repeatedly requesting at least some other media stream data from the untrusted application-level code until detecting an event.

5. The method of claim 1 further comprising:
repeatedly requesting at least some other media stream data from the untrusted application-level code until information is received from the untrusted application-level code that informs the application environment that the media stream data is exhausted.

6. The method of claim 1 further comprising:
repeatedly requesting at least some other media stream data from the untrusted application-level code until information is received from the untrusted application-level code that informs the application environment of a seek operation.

7. The method of claim 1 further comprising:
communicating information from the untrusted application-level code to the application environment that informs the application environment of an error encountered by the untrusted application-level code.

8. The method of claim 1 further comprising:
communicating information from the application environment to the untrusted application-level code that informs the untrusted application-level code of an error encountered by the application environment.

9. The method of claim 1 further comprising:
communicating information between the application environment and the untrusted application-level code indicating that a license for playing protected media data is required.

10. The method of claim 1 further comprising:
communicating information between the application environment and the untrusted application-level code indicating that a license for playing protected media data is required; and
communicating information from the untrusted application-level code to the application environment that provides the license for playing the protected media data, including any needed decryption data.

11. In a computing environment, a system comprising:
at least one processor;
a memory, communicatively coupled to the at least one processor;
an application environment including a platform level implemented at least in part on the at least one processor; and
an application programming interface set configured to couple untrusted application-level code to the platform level, the untrusted application-level code configured to process a content container, including unpacking content from the container to provide at least some of the content to the platform level via communication with the application environment through application programming interface calls, the container having a format that is not supported by the platform level.

12. The system of claim 11 wherein the content comprises media arranged as stream data, and wherein the untrusted application-level code instantiates a media stream source component from an instance of an abstract class.

13. The system of claim 11 wherein the content comprises media arranged as stream data, and wherein the platform level comprises a media element.

14. The system of claim 11 wherein the content comprises media arranged as stream data, and wherein the platform level requests samples of media from the untrusted application-level code.

15. The system of claim 11 wherein the untrusted application-level code downloads the container.

16. A computer-readable storage device having computer-executable instructions stored thereon, which in response to execution by a computer, cause the computer to perform operations comprising:
enabling untrusted code to download and unpack a container comprising media content in a format understood by the untrusted code, the untrusted code being code that communicates through application programming interface calls to a platform level, the container having a format that is not supported by the platform level;
sending, from the platform level, a request for samples of the media content through a set of application programming interfaces to the untrusted code;
receiving, by the platform level, the samples of the media content from the untrusted code in response to the request; and
providing the samples of the media content to a media pipeline for playback.

17. The computer-readable storage device of claim 16 having further computer-executable instructions comprising:
communicating with the untrusted code, including receiving a notification of a desired seek operation, stop operation, pause operation, resume operation or an error, and in response, requesting that the untrusted code perform an action corresponding to the received notification.

18. The computer-readable storage device of claim 16 having further computer-executable instructions comprising:
requesting that the untrusted code open media prior to requesting the samples, receiving information from the untrusted code after receiving at least one sample that indicates that no further samples are available, and requesting that the untrusted code close the media.

19. The system of claim 11, wherein the application programming interface communicates information between the application environment and the untrusted application-level code indicating that a license for playing protected media data is required.

20. The computer-readable storage device of claim 16 having further computer-executable instructions comprising:
communicating information from the untrusted code to an application environment that provides a license for playing protected media content, including any needed decryption data.

* * * * *